United States Patent [19]
Marholev et al.

[11] Patent Number: 6,085,342
[45] Date of Patent: Jul. 4, 2000

[54] ELECTRONIC SYSTEM HAVING A CHIP INTEGRATED POWER-ON RESET CIRCUIT WITH GLITCH SENSOR

[75] Inventors: Bojko Marholev, Lund; Torbjörn Gärdenfors, Malmö; Christian Björk, Åkarp, all of Sweden

[73] Assignee: Telefonaktiebolaget L M Ericsson (publ), Stockholm, Sweden

[21] Appl. No.: 08/851,875

[22] Filed: May 6, 1997

[51] Int. Cl.[7] .............................. G01R 31/28; H03L 7/00; G06F 11/00

[52] U.S. Cl. ........................... 714/724; 714/745; 327/143

[58] Field of Search .................................. 714/724, 733, 714/734, 736, 738, 745; 395/750; 327/143

[56] References Cited

U.S. PATENT DOCUMENTS

| | | | |
|---|---|---|---|
| 4,489,394 | 12/1984 | Borg | 364/900 |
| 4,586,179 | 4/1986 | Sirazi et al. | 371/12 |
| 5,070,450 | 12/1991 | Holman, Jr. et al. | 395/750 |
| 5,181,203 | 1/1993 | Frenkil | 371/15 |
| 5,182,810 | 1/1993 | Bartling et al. | 395/750 |
| 5,297,261 | 3/1994 | Kuranga | 395/325 |
| 5,376,835 | 12/1994 | Van Buskirk et al. | 327/143 |
| 5,442,774 | 8/1995 | Pickup et al. | 395/550 |
| 5,586,334 | 12/1996 | Miyazaki et al. | 395/750 |
| 5,818,271 | 10/1998 | Stanojevic | 327/143 |

FOREIGN PATENT DOCUMENTS

WO88/05569  7/1988  WIPO.

*Primary Examiner*—Hoa T. Nguyen
*Attorney, Agent, or Firm*—Jenkens & Gilchrist, PC

[57] ABSTRACT

A power-on reset circuit with glitch sensing capabilities is formed as part of the same integrated circuit chip containing other logical circuits. A port included in the integrated circuit chip enables a power-on reset signal generated by the integrated power-on reset circuit to be output from the chip and applied to other chips installed in a single chip or multi-chip electronic system. The power-on reset circuit compares a capacitor stored reset voltage to a reference voltage and outputs the power-on reset signal when the reset voltage falls below the reference voltage. Storage of the reset voltage by the capacitor is controlled by a glitch sensor which detects changes in voltage provided by a power supply in excess of a given threshold and, in response thereto, triggers a capacitor discharge. This causes the reset voltage to fall below the reference voltage, and the power-on reset signal to be output. Furthermore, for synchronously operated systems, the output power-on reset signal is synchronized with an edge of an output clock signal.

22 Claims, 3 Drawing Sheets

ELECTRONIC SYSTEM HAVING A CHIP INTEGRATED POWER-ON RESET CIRCUIT WITH GLITCH SENSOR

BACKGROUND OF THE INVENTION

1. Technical Field of the Invention

The present invention relates to a power-on reset circuit and, in particular, to the implementation of a power-on reset circuit with a glitch sensing capability in a single chip or multi-chip electronic system environment.

2. Description of Related Art

A power-on reset circuit is included in many electronic devices and, in particular, those electronic devices which include microprocessing or other digital integrated (logic) circuit elements. It is desirable to initialize or reset these types of elements to a particular known logical state every time power is initially applied. The power-on reset circuit typically operates to detect a powering-up of the electronic device, and in response thereto inhibits activation of the electronic device (or, perhaps, certain specific elements thereof) for a period of time believed sufficient for full and stabilized power to become available for device use. A reset of the electronic device (or its included elements) to a known state is then initiated.

It is desirable for the power-on reset circuit to be activated not only when power is first applied to the electronic device, but also in instances where a glitch in the applied power occurs. What is needed then is a power-on reset circuit with glitch sensing capability.

In the typical electronic device, the power-on reset circuit is implemented as a separate collection of interconnected circuit elements and/or devices. The circuit generates an output reset signal that is connected to various other elements of the electronic device which are sensitive to power variations like that experienced at first power application. This architecture is commonly utilized in multi-chip electronic systems where the power-on reset circuit is implemented in its own chip package (or perhaps as discrete components) and assembled and interconnected with other chips for the system. One disadvantage of this common architectural implementation is that the power-on reset circuit occupies valuable circuit board space that could more advantageously be utilized for the installation of other chips.

It is known to form the power-on reset circuit as a part of the same monolithic semiconductor integrated circuit chip which contains other functionalities such as logic or memory circuits. However, it is redundant and wasteful to incorporate the power-on reset circuit within each individual chip of a multi-chip electronic system. What is needed then is a mechanism to more efficiently utilize an integrated (i.e., same chip) power-on reset circuit in a multi-chip environment. Such an implementation should further support those designs wherein the multi-chip electronic system is implemented into a single integrated circuit chip.

SUMMARY OF THE INVENTION

To address the foregoing and other problems, one integrated circuit chip within a multi-chip electronic system includes an integrated power-on reset circuit. By "integrated" it is meant that the power-on reset circuit is formed on a single semiconductor integrated circuit with other included logic components. That chip further includes a port for outputting a power-on reset signal that is generated by the integrated power-on reset circuit in response to a power supply change, power-up, or glitch. The output signal is then applied to the multiple other included chips within the electronic system to effectuate a system-wide reset.

In the instance of a system implemented as a single chip electronic system, the signal is output to other logic components within the chip.

With respect to a synchronously operating system (single chip or multi-chip), the output power-on reset signal applied to the logic components is synchronized with an edge of an output clock signal that is also applied to the logic components.

The integrated power-on reset circuit comprises a comparator, a capacitor for storing a reset voltage, and a glitch sensor. The comparator compares the capacitor stored reset voltage to a reference voltage and outputs the power-on reset signal when the reset voltage falls below the reference. The glitch sensor detects changes in voltage output from a power supply in excess of a given threshold and, in response thereto, triggers a discharge of the capacitor. This discharge causes the reset voltage to fall below the reference voltage, with the comparator then generating the power-on reset signal for output.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1A:
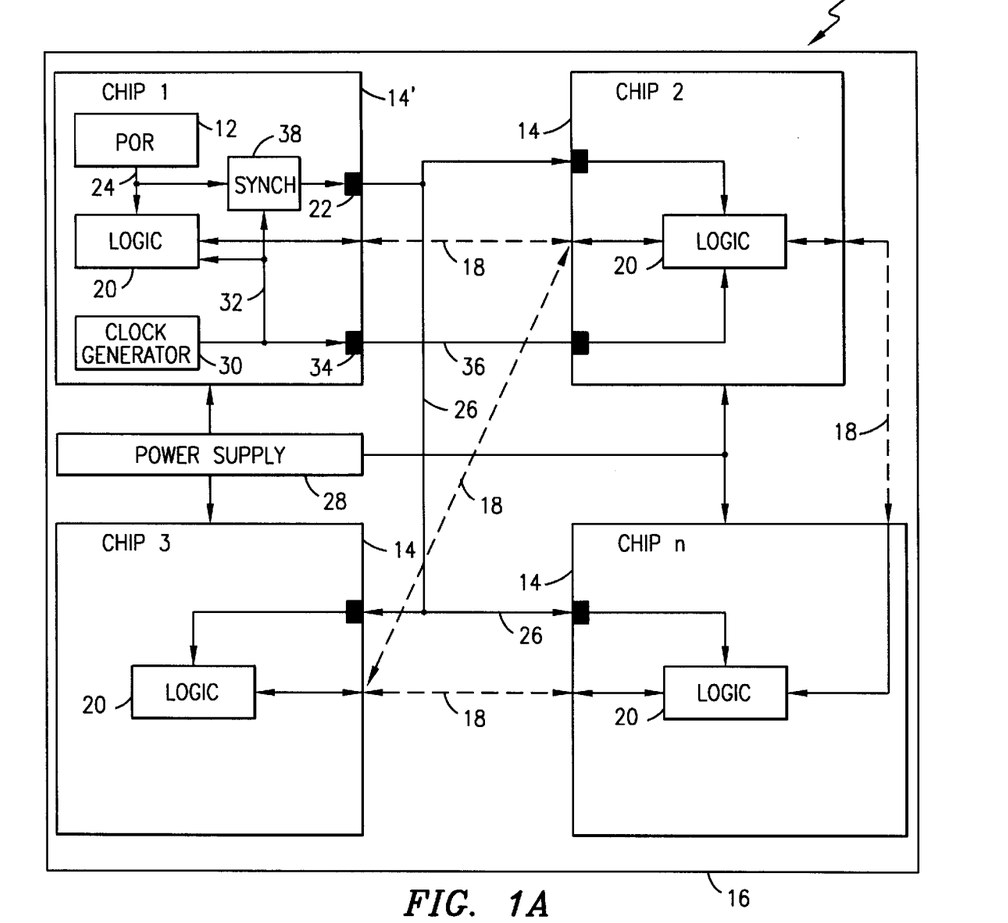
FIG. 1A is a block diagram of a multi-chip electronic system having an integrated power-on reset circuit.

Reference is now made to FIG. 1A wherein there is shown a block diagram of a multi-chip electronic system 10 having an integrated power-on reset (POR) circuit 12. The multi-chip electronic system 10 includes a plurality of chips 14 assembled (installed) on a printed circuit board 16. The multi-chip electronic system 10 may be designed to implement any one of a number of functionalities, with each individual chip 14 performing a requisite sub-functionality in furtherance thereof.

The particular functionality provided by the system 10, and the particular sub-functionalities provided by the included chips 14, are not necessarily relevant to the operation and configuration of the integrated power-on reset circuit 12 of the present invention. The present invention may be implemented in any chip 14 performing any one of a number of user selected sub-functionalities, as well as in connection with any multi-chip electronic system 10 performing any one of a number of user selected functionalities, where a power-on reset capability needs to be provided for proper system and chip operation.

The chips 14 of the multi-chip electronic system 10 are interconnected for communication with each other by a plurality of connections (illustrated by broken lines) 18. These connections may comprise individual circuit traces on the printed circuit board 16, bus or other types of multiple grouped trace connections, as well as other types of communications links, cables, wires, and the like, as are needed to enable the chips 14 to communicate with each other and with other discrete circuit components (not shown) for the purpose of implementing the requisite system functionalities and sub-functionalities of system 10 operation.

At least one of the chips 14' within the multi-chip electronic system 10 includes an integrated power-on reset circuit 12. By "integrated" it is meant that the discrete circuit components (to be described herein) comprising the power-on reset circuit 12 are included within and as a part of the chip 14' itself, rather than in a separate chip or a separate discrete circuit mounted to the circuit board 16 as in the prior art architecture. Thus, the chip 14' may be viewed as having a certain logic component 20 for performing the designated sub-functionality of the chip, along with the power-on reset circuit 12, that is designed, constructed and implemented on a single monolithic semiconductor integrated circuit. For example, the power-on reset circuit 12 and resettable logic component 20 may be designed in connection with a single semiconductor device. In this integrated implementation, the sub-functionality implemented by the resettable logic component 20 of the chip 14' does not provide or generate power-on reset signals, although the sub-functionality may respond to such signals as generated for output by the integrated power-on reset circuit 12.

The integrated chip 14' further includes an output port 22 from which a power-on reset signal generated by the integrated power-on reset circuit 12 is output. This generated signal is further applied through internal circuit connections 24 to the resettable logic component 20 of the integrated chip 14' to effectuate a reset of that logic component. In addition to the plurality of connections 18 between the chips 14, the multi-chip electronic system 10 further includes a power-on reset connection 26 from the output port 22 of the integrated chip 14' to the other included chips 14. In particular, the power-on reset connection 26 connects the integrated power-on reset circuit 12 of the chip 14' through the output port 22 to the resettable logic components 20 of the other chips 14 to effectuate a reset of those logic components. Thus, when a power supply 28 for the multi-chip electronic system is changed (perhaps as a result of a battery replacement), a power-up occurs, or a power glitch occurs, the integrated power-on reset circuit 12 of the chip 14' detects such an event, and then generates and outputs the power-on reset signal for application to its own resettable logic component 20 and through the connection 26 to other resettable logic components on other chips 14.

The system 10 may require synchronous operation, and thus further include at least one clock generator 30 preferably implemented within one of the chips 14. In the illustrated example, the clock generator 30 is included within the chip 14' which also contains the integrated power-on reset circuit 12. The clock generator 30 generates and outputs a clock signal in a manner well known in the art. The clock signal is applied to the logic component 20 of chip 14' through an internal connection 32. The chip 14' still further includes a clock port 34 connected to the clock generator 30 and from which the clock signal is output. In addition to the plurality of connections 18 and 26 between the chips 14, the multi-chip electronic system 10 further includes a clock connection 36 from the output port 34 of the integrated chip 14' to the other included chips 14. In particular, the clock connection 36 connects the clock generator 30 of the chip 14' through the output port 34 to the resettable logic components 20 of the other chips 14 in the system 10 to synchronize their operation.

The system 10, and in particular chip 14', still further includes a synchronization circuit 38 which functions to synchronize application of the power-on reset signal output from the power-on reset circuit 12 with the clock signal output from the clock generator 30. In particular, and as will be disclosed in more detail below, the clock signal includes an edge (such as a negative edge), and the synchronization circuit 38 operates to shift the power-on reset signal in time such that a positive edge of the power-on reset signal is synchronized with the negative edge of the clock signal for application to the logic components 20 of the other chips 14.

Figure 1B:
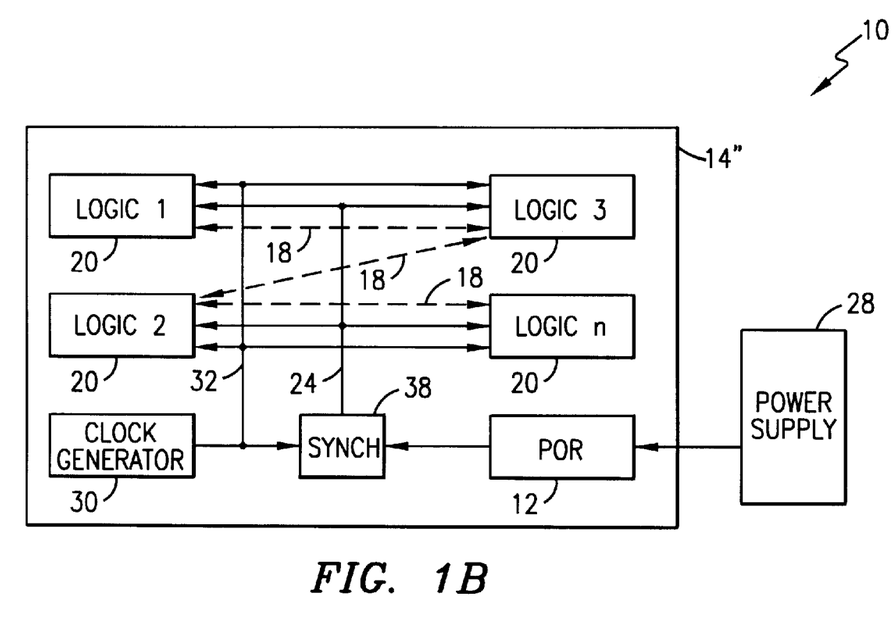
FIG. 1B is a block diagram of a single chip electronic system having an integrated power-on reset circuit.

Reference is now made to FIG. 1B wherein there is shown a block diagram of an electronic system 10' having an integrated power-on reset (POR) circuit 12. The electronic system 10' comprises a single integrated circuit chip 14" designed to implement any one of a number of functionalities using a plurality of logic components 20 performing a requisite sub-functionality in furtherance thereof.

The logic components 20 of the multi-chip electronic system 10 are interconnected for communication with each other by a plurality of integrated circuit connections (illustrated by broken lines) 18. The chip 14" for the electronic system 10' includes an integrated power-on reset circuit 12. By "integrated" it is meant that the discrete circuit components (to be described herein) comprising the power-on reset circuit 12 are included within and as a part of the chip 14" itself, rather than in a separate chip or a separate discrete circuit as in the prior art architecture. Thus, the chip 14" may be viewed as having a plurality of logic components 20 for performing the designated sub-functionality of the chip, along with the power-on reset circuit 12, that is designed, constructed and implemented on a single monolithic semiconductor integrated circuit. For example, the power-on reset circuit 12 and resettable logic components 20 may be designed in connection with a single semiconductor device. In this integrated implementation, the sub-functionalities implemented by the resettable logic components 20 of the chip 14" do not provide or generate power-on reset signals, although the sub-functionalities may respond to such signals as generated for output by the integrated power-on reset circuit 12.

A power-on reset signal is generated by the integrated power-on reset circuit 12, and output for application through internal circuit connections 24 to the resettable logic components 20 of the integrated chip 14" to effectuate a reset of those logic components. Thus, when a power supply 28 for the multi-chip electronic system is changed (perhaps as a result of a battery replacement), a power-up occurs, or a power glitch occurs, the integrated power-on reset circuit 12 of the chip 14" detects such an event, and then generates and outputs the power-on reset signal for application to the resettable logic components 20 through the connection 24.

The system 10' may require synchronous operation, and thus further include at least one clock generator 30 also integrated within the chip 14". The clock generator 30 generates and outputs a clock signal in a manner well known in the art. The clock signal is applied to the logic components 20 of the chip 14" through an internal connection 32 to synchronize their operation.

The chip 14" still further includes a synchronization circuit 38 which functions to synchronize application of the power-on reset signal output from the power-on reset circuit 12 with the clock signal output from the clock generator 30. In particular, and as will be disclosed in more detail below, the clock signal includes an edge (such as a negative edge), and the synchronization circuit 38 operates to shift the power-on reset signal in time such that a positive edge of the power-on reset signal is synchronized with the negative edge of the clock signal for application to the logic components 20.

Figure 2:
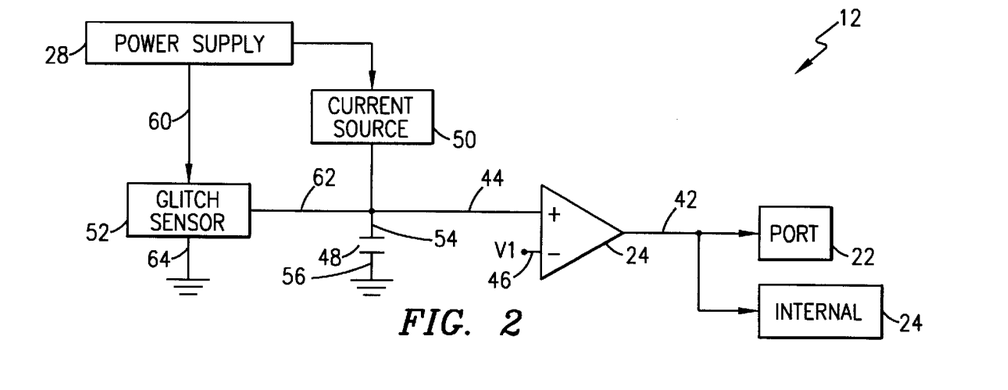
FIG. 2 is a block diagram of the integrated power-on reset circuit.

Reference is now made to FIG. 2 wherein there is shown a block diagram of the integrated power-on reset circuit 12. The integrated power-on reset circuit 12 comprises a comparator 40 implemented through the use of an operational amplifier circuit. The comparator 40 includes an output 42 from which the power-on reset signal is generated. The output 42 is connected to the output port 22 for application of the power-on reset signal to the resettable logic components 20 of other chips 14, and is also connected to the internal circuit connections 24 for application of the power-on reset signal to the resettable logic component 20 of the integrated chip 14'. The comparator 40 further includes a positive input 44 and a negative input 46. The negative input 46 is applied with a first reference voltage (V1). The comparator 40 operates to compare a voltage applied to the positive input 44 against the first reference voltage (V1), and generate the power-on reset signal (logic level low) at the output 42 if the applied voltage changes with respect to the first reference voltage.

The integrated power-on reset circuit 12 further includes a charging capacitor 48, a current generator 50, and a glitch sensor 52. The charging capacitor 48 includes a first end 54 connected to the positive input 44 of the comparator 40, and a second end 56 connected to ground. An output 58 of the current generator 50 is connected to the first end 54 of the capacitor 48 and the positive input 44 of the comparator 40. The glitch sensor 52 has an input 60 connected to the power supply 28 for the multi-chip electronic system 10, an output 62 connected to the first end 54 of the capacitor 48 and the positive input 44 of the comparator 40, and an output 64 connected to ground.

Operation of the integrated power-on reset circuit 12 is as follows. The current generator 50 charges the charging capacitor 48 with a reset voltage having a level that exceeds the first reference voltage (V1). In this state, no power-on reset signal (i.e., logic level high) is generated at the output 42 of the comparator 40. The glitch sensor 52 then detects a power supply 28 change, a power-up or a glitch. Responsive thereto, the glitch sensor 52 discharges the reset voltage stored in the charging capacitor 48 through the output 64 to ground. When the capacitor 48 has been discharged to a point where the voltage applied by the capacitor to the positive input 44 is less than the first reference voltage (V1), the comparator 40 generates the power-on reset signal (i.e., logic level low) at its output 42. Following discharge, the current generator 50 charges the charging capacitor 48 back up to a voltage level exceeding the first reference voltage (V1), and the comparator 40 ceases generation of the power-on reset signal (i.e., logic level high). The time taken to charge the capacitor 48 back to a voltage level exceeding the first reference voltage (i.e., to re-set the comparator 40) depends on the size of the capacitor and the strength of the charging current. This re-set time should be set long enough for the power supply 28 to stabilize following the glitch sensor 52 detected power supply change, power-up, or glitch.

Due to the integrated inclusion of the power-on reset circuit 12 within the chip 14', the value of the capacitor 48 is preferably kept relatively small (e.g., in the range of approximately two picofarads). To maintain use of such a small valued capacitor 48, the charging current output from the current generator 50 must also be kept relatively small. For example, with a capacitance value of two picofarads, a capacitor charged voltage of 1.3 volts, and a re-set time of ten milliseconds, the formula:

$$v(t) = \frac{1}{C}\int_0^\tau i(x)dx + v(0) \qquad (1)$$

gives a constant charging current of:

$$i = \frac{v \cdot C}{t} = \frac{1.3\,\text{V} \cdot 2\,\text{pF}}{10\,\text{ms}} = 0.26\,\text{nA} \qquad (2)$$

if the initial value of the capacitor voltage is zero (i.e., the capacitor 48 was fully discharged by the operation of the glitch sensor 52).

Figure 3:
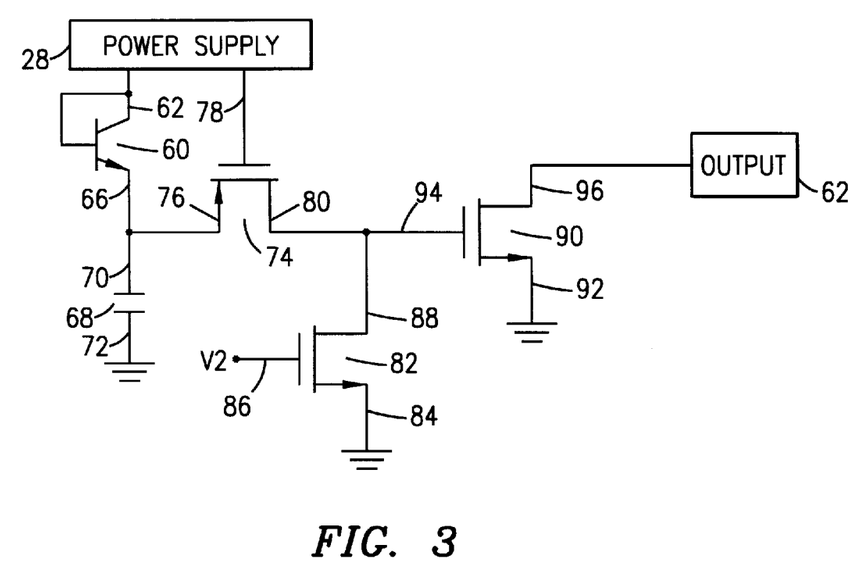
FIG. 3 is a block diagram of a glitch sensor included in the integrated power-on reset circuit of FIG. 2.

Reference is now made to FIG. 3 wherein there is shown a block diagram of the glitch sensor 52 included in the integrated power-on reset circuit 12 of FIG. 2. The glitch sensor 52 includes a transistor 60 (preferably bi-polar in nature and construction) having a collector terminal 62, base terminal 64 and emitter terminal 66. The transistor 60 is configured to function as a diode with its collector terminal 62 and base terminal 64 connected to each other, and then further connected to the power supply 28. The transistor 60 accordingly could be implemented as any p-n junction, and thus be replaced by a diode if available. The glitch sensor 52 further includes a charging capacitor 68 including a first end 70 connected to the emitter terminal 66 of the transistor 60, and a second end 72 connected to ground. The glitch sensor 52 still further includes a transistor 74 (preferably field effect in nature and construction) having a source terminal 76, gate terminal 78 and drain terminal 80. The source terminal 76 is connected to the first end 70 of the charging capacitor 68 and the emitter terminal 66 of the transistor 60. The gate terminal 78 is connected to the power supply 28. The glitch sensor 52 also includes a transistor 82 (preferably field effect in nature and construction) having a source terminal 84, gate terminal 86 and drain terminal 88. The source terminal 84 is connected to ground. The gate terminal 86 is connected to a second reference voltage (V2). The drain terminal 88 is connected to the drain terminal 80 of the transistor 74. The glitch sensor 52 still further includes a transistor 90 (preferably field effect in nature and construction) having a source terminal 92, gate terminal 94 and drain terminal 96. The source terminal 92 is connected to ground. The gate terminal 94 is connected to the drain terminal 88 of the transistor 82 and the drain terminal 80 of the transistor 74. The drain terminal 96 is connected to the output 62 (which is connected to the first end 54 of the capacitor 48 as shown in FIG. 2).

The individual circuit components of the glitch sensor 52 are implemented using integrated circuit fabrication techniques on a single circuit in conjunction with the integrated circuit implementation of the comparator (operational amplifier) 40, charging capacitor 48 and current generator 50. Furthermore, all of the foregoing components of the power-on reset circuit 12 are preferably implemented using integrated circuit fabrication techniques on the same single circuit in conjunction with the included logical component 20 for the chip 14' (see, FIG. 1A), or with multiple logic components 20 for the chip 14" (see, FIG. 1B).

Operation of the glitch sensor 52 is as follows. The capacitor 68 is charged from power supply 28 through the diode connected transistor 60. This diode connection of transistor 60 prevents the charged capacitor 68 from discharging through the power supply 28 in the event of a subsequent power supply change, power-up or glitch. The transistor 74 operates as a switch with an actuation dependent upon the voltage difference between a glitch voltage stored in the capacitor 68 and the voltage of the power supply 28 (i.e., the voltage difference from gate terminal 78 to source terminal 76). The discharging of the capacitor 48 (see, FIG. 2) is controlled by the transistor 90. The second reference voltage (V2) controls transistor 82 operation to insure that the transistor 90 is shut off when the transistor 74 is also shut off. In this mode, the capacitor 48 (see, FIG. 2) is charged, and no power-on reset signal (i.e., logic level high) is being output from the comparator 40 (see, FIG. 2). When a change, power-up, or glitch occurs with respect to the power supply 28, the power supply voltage output drops (to some degree) and the voltage difference from gate terminal 78 to source terminal 76 (i.e., in comparison to the glitch voltage) increases above a threshold level. This turns (switches) on the transistor 74, causing an increase in the voltage difference from gate terminal 94 to source terminal 92 of the transistor 90. When this voltage difference exceeds a threshold, the transistor 90 turns (switches) on, and the capacitor 48 (FIG. 2) discharges (through the transistor 90) to ground. This causes a generation of the the power-on reset signal (i.e., logic level low). Operation of the glitch sensor 52 is identical for change, power-up, or glitch detection. The difference between change/power-up and glitch is, depending on the type of power supply 28 used, a difference in the resistance between the power supply and ground. In the case of a glitch, this resistance is close to zero. In change/power-up, the resistance is higher. The power supply voltage may decrease more slowly (depending on the capacitance and resistance between supply and ground) when the power supply is disconnected. In instances where the power supply voltage decreases faster than the voltage decrease over capacitor 68, regardless of change, power-up, or glitch in the power supply 28, the capacitor 48 is discharged and the power-on reset signal generated.

As discussed above, with the discharge of the capacitor 48, the voltage applied to the positive input 44 drops below the first reference voltage (V1) and the comparator 40 generates the power-on reset signal at its output 42 (i.e., logic lovel low). This signal is applied to the resettable logical component 20 of the integrated chip 14'. In a multi-chip electronic system 10 (see, FIG. 1A), this generated power-on reset signal is further output from the output port 22 of the chip 14' and applied to the resettable logic components 20 of the other chips 14. Alternatively, as illustrated by FIG. 1B, the chips 14 can be viewed as a sub-circuit in a system 10' that is implemented on a single integrated circuit chip 14''.

Figure 4:
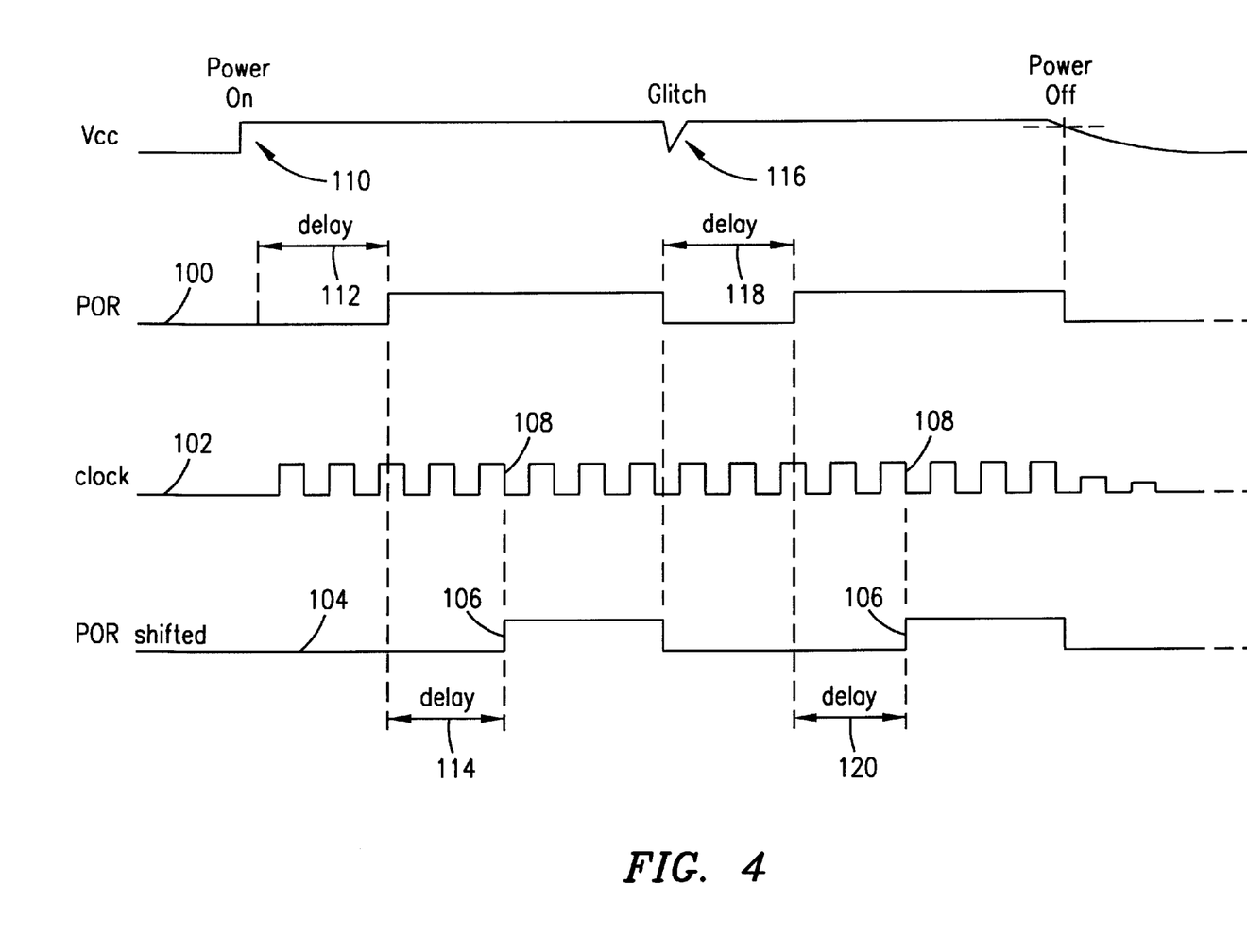
FIG. 4 is a timing diagram illustrating the synchronization of a power-on reset signal with a clock signal.

Reference is now made to FIG. 4 wherein there is shown a timing diagram illustrating the synchronization of a power-on reset signal 100 with a clock signal 102. The power-on reset signal 100 is output by the power-on reset circuit (as described above), and the clock signal 102 is output by the clock generator (as described above). The synchronization circuit (as described above) operates to shift the power-on reset signal in time producing the shifted power-on reset signal 104 wherein a positive edge 106 of the shifted power-on reset signal is aligned in time with a negative edge 108 of the clock signal 102.

When power is first applied, as generally indicated at 110, the clock signal 102 begins to generate, and a delay 112 is experienced before the power-on reset signal 100 transitions from low to high. The synchronization circuit introduces a further delay 114 with resect to the shifted power-on reset signal 104 in order to synchronize edge 106 with edge 108. At a later time, as generally indicated at 116, a glitch is detected, and the power-on reset signal 100 as well as the shifted power-on reset signal 104 both transition from high to low. Another delay 118 is experienced before the power-on reset signal 100 transitions from low to high. The synchronization circuit introduces a further delay 120 with resect to the shifted power-on reset signal 104 in order to synchronize edge 106 with edge 108.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. In this regard, it will further be understood that the power-on reset circuit 12 need not necessarily be implemented in an integrated fashion within a chip 14'.

What is claimed is:

1. A multi-chip electronic system implementing a certain functionality, comprising:

a plurality of integrated circuit chips, each including resettable logic components implementing a certain sub-functionality in furtherance of the certain functionality;

a power-on reset circuit integrated within a certain one of the plurality of integrated circuit chips, the power-on reset circuit generating a power-on reset signal responsive to a power supply change, power-up, or glitch;

an output port on the certain one of the plurality of integrated circuit chips, the output port connected to receive the generated power-on reset signal; and a connection from the output port on the certain one of the plurality of integrated circuit chips to the resettable logic on the others of the plurality of integrated circuit chips for application thereto of the generated power-on reset signal.

2. The system of claim 1 further including means for interconnecting between the resettable logic components of the plurality of integrated circuit chips.

3. The system of claim 1 wherein the power-on reset circuit comprises:

means for generating a reference voltage;

means for storing a reset voltage;

means for sensing the power supply change, power-up, or glitch and in response thereto discharging the stored reset voltage; and means for comparing the reference voltage to the reset voltage and generating the power-on reset signal if the reset voltage is discharged and falls below the reference voltage.

4. The system of claim 3 wherein the means for storing comprises:

a capacitor; and a current source for charging the capacitor to the reset voltage.

5. The system of claim 3 wherein the means for comparing comprises an operational amplifier configured as a comparator and having a first input receiving the reset voltage and a second input receiving the reference voltage.

6. The system of claim 3 wherein the means for sensing and discharging comprises:

means for storing a glitch voltage;

means for measuring a difference between the stored glitch voltage and power supply voltage, and comparing the measured difference to a threshold; and switch means connected between the means for storing the reset voltage and ground for discharging the stored reset voltage to ground if the measured difference exceeds the threshold.

7. The system of claim 3 wherein the means for sensing and discharging comprises:

a capacitor;

means for charging the capacitor with a glitch voltage;

a first transistor connected between the capacitor and a power supply, and operable to compare a power supply voltage and the glitch voltage to detect the power supply change, power-up, or glitch; and a second transistor connected between the first transistor, the means for storing the reset voltage and a ground, and operable to discharge the stored reset voltage to ground in response to a first transistor detected power supply change, power-up, or glitch.

8. The system of claim 7 wherein the power-on reset circuit further comprises a third transistor connected between the first transistor, second transistor, ground and a voltage reference.

9. The system of claim 1 further including:

a clock generator integrated within the certain one of the plurality of integrated circuit chips, the clock generator generating a clock signal having an edge;

a clock port on the certain one of the plurality of integrated circuit chips, the clock port connected to receive the generated clock signal; and a synchronization circuit integrated within the certain one of the plurality of integrated circuit chips and connected to the power-on reset circuit and the clock generator, the synchronization circuit operating to synchronize an edge of the power-on reset signal output from the output port with the edge of the clock signal output from the clock port.

10. A reset circuit, comprising:

means for generating a reference voltage;

means for storing a reset voltage;

means for storing a glitch voltage;

means for measuring a difference between the stored glitch voltage and power supply voltage, and comparing the measured difference to a threshold;

switch means connected between the means for storing the reset voltage and around for discharging the stored reset voltage to ground it the measured difference exceeds the threshold; and means for comparing the reference voltage to the reset voltage and generating a reset signal if the reset voltage is discharged and falls below the reference voltage.

11. The circuit as in claim 10 wherein the means for storing a reset voltage comprises:

a capacitor; and a current source for charging the capacitor to the reset voltage.

12. The circuit as in claim 10 wherein the means for comparing comprises an operational amplifier configured as a comparator and having a first input receiving the reset voltage and a second input receiving the reference voltage.

13. The circuit of claim 10 wherein the means for storing a glitch voltage comprises a capacitor; and the means for measuring a difference comprises a first transistor connected between the capacitor and a power supply, and operable to compare a power supply voltage and the glitch voltage to detect the power supply glitch; and the switch means comprises a second transistor connected between the first transistor, the means for storing the reset voltage and a ground, and operable to discharge the stored reset voltage to ground in response to a first transistor detected power supply glitch.

14. An integrated circuit chip implementing a certain functionality, comprising:

a plurality of resettable logic components integrated within the circuit chip and implementing a certain sub-functionality in furtherance of the certain functionality;

a power-on reset circuit integrated within the circuit chip, the power-on reset circuit generating a power-on reset signal responsive to a power supply change, power-up, or glitch; and means for applying the generated power-on reset signal to each of the logic components.

15. The system of claim 14 wherein the power-on reset circuit comprises:

means for generating a reference voltage;

means for storing a reset voltage;

means for sensing the power supply change, power-up, or glitch and in response thereto discharging the stored reset voltage; and means for comparing the reference voltage to the reset voltage and generating the power-on reset signal if the reset voltage is discharged and falls below the reference voltage.

16. The system of claim 15 wherein the means for storing comprises:

a capacitor; and a current source for charging the capacitor to the reset voltage.

17. The system of claim 15 wherein the means for comparing comprises an operational amplifier configured as a comparator and having a first input receiving the reset voltage and a second input receiving the reference voltage.

18. The system of claim 15 wherein the means for sensing and discharging comprises:

means for storing a glitch voltage;

means for measuring a difference between the stored glitch voltage and power supply voltage, and comparing the measured difference to a threshold; and switch means connected between the means for storing the reset voltage and ground for discharging the stored reset voltage to ground if the measured difference exceeds the threshold.

19. The system of claim 15 wherein the means for sensing and discharging comprises:

a capacitor;

means for charging the capacitor with a glitch voltage;

a first transistor connected between the capacitor and a power supply, and operable to compare a power supply voltage and the glitch voltage to detect the power supply change, power-up, or glitch; and a second transistor connected between the first transistor, the means for storing the reset voltage and a ground, and operable to discharge the stored reset voltage to ground in response to a first transistor detected power supply change, power-up, or glitch.

20. The system of claim 19 wherein the power-on reset circuit further comprises a third transistor connected between the first transistor, second transistor, ground and a voltage reference.

21. The system of claim 14 further including:

a clock generator integrated within the circuit chip, the clock generator generating a clock signal having an edge; and a synchronization circuit integrated within the circuit chip and connected to the power-on reset circuit and the clock generator, the synchronization circuit operating to synchronize an edge of the power-on reset signal for application to the logic components with the edge of the clock signal.

22. A method for generating a reset signal, comprising;

storing a reset voltage;

storing a glitch voltage;

comparing a lower supply voltage to the glitch voltage;

generating a switching signal if the comparison indicates that the supply voltage differs from the glitch voltage by more that a predetermined threshold;

discharging the stored reset voltage in response to the detection of the power supply change or power-up, or generation of switching signal;

comparing the stored reset voltage to a reference voltage; and outputting the reset signal if the comparison indicates that the stored reset voltage has dropped below the reference voltage.

* * * * *

UNITED STATES PATENT AND TRADEMARK OFFICE
CERTIFICATE OF CORRECTION

PATENT NO. : 6,085,342
DATED : July 4, 2000
INVENTOR(S) : Marholev et al.

It is certified that error appears in the above-indentified patent and that said Letters Patent is hereby corrected as shown below:

Column 9, line 47    Please replace "around" with --ground--.

Column 9, line 48    Please replace "it" with --if--.

Column 12, line 2    Please replace "lower" with --power--.

Column 12, line 4    Please insert --power-- between "the" and "supply".

Column 12, line 5    Please replace "that" with --than--.

Column 12, line 8    Please insert --the-- between "of" and "switching".

Signed and Sealed this

Fifteenth Day of May, 2001

Attest:

NICHOLAS P. GODICI

*Attesting Officer*    *Acting Director of the United States Patent and Trademark Office*